United States Patent [19]
Kampfer

[11] 3,935,556
[45] Jan. 27, 1976

[54] DUAL FUNCTION LOGGING TOOL AND METHOD

[75] Inventor: John G. Kampfer, Houston, Tex.

[73] Assignee: Halliburton Company, Duncan, Okla.

[22] Filed: May 21, 1974

[21] Appl. No.: 471,900

Related U.S. Application Data

[62] Division of Ser. No. 381,474, July 23, 1973, Pat. No. 3,862,417.

[52] U.S. Cl. ........ 340/18 CM; 250/256; 179/15 BP; 328/157; 328/139; 340/18 P; 340/203
[51] Int. Cl.² .... G01V 1/40; H04J 7/00; G01V 5/00
[58] Field of Search .......... 250/256, 261, 262, 263, 250/264, 269, 270; 340/18 P, 18 C, 18 M, 203, 209; 328/142, 150, 157, 139; 179/15 BP; 325/42

[56] References Cited
UNITED STATES PATENTS

| | | |
|---|---|---|
| 2,998,521 | 8/1961 | Rankin, Jr. .......................... 250/263 |
| 3,445,658 | 5/1969 | Ward .................................. 250/263 |
| 3,612,771 | 10/1971 | Caniquit .......................... 179/15 BP |
| 3,697,875 | 10/1972 | Guanella .............................. 325/42 |
| 3,732,495 | 5/1973 | McRae et al. ..................... 340/203 |

Primary Examiner—T. H. Tubbesing
Assistant Examiner—H. A. Birmiel
Attorney, Agent, or Firm—Burns, Doane, Swecker & Mathis

[57] ABSTRACT

A method and apparatus for converting a single function, i.e., hydrocarbon detection, well logging tool to a dual function tool, i.e., the detection of naturally occurring gamma rays, by making the amplitude reference pulses necessary for single function operation related in rate to the second function. A minimum constant rate of amplitude reference pulses are provided to ensure the operability of the single function tool in the absence of the second function and an adjustment is thereafter made to remove the effects of this minimum rate of reference pulses.

4 Claims, 3 Drawing Figures

DUAL FUNCTION LOGGING TOOL AND METHOD

This is a division of application Ser. No. 381,474, filed July 23, 1973.

BACKGROUND OF THE INVENTION

The present invention relates to a tool and method for simultaneously detecting hydrocarbons and naturally occurring gamma rays.

Hydrocarbon logging systems are well known in the art and conventionally include a logging tool adapted for movement through the well bore under the control of a surface unit. The well tool customarily contains a radioactive source and a scintillation detector responsive to radiation reflected from and/or emitted from the formation as a result of radiation from the radioactive source. The quantitative hydrocarbon information is generally contained in the amplitude and rate of the pulse output signal from the scintillation detector and this pulse signal is transmitted to the surface over the logging cable. Constant amplitude reference pulses are also generated in the tool at a predetermined frequency and these reference pulses are also transmitted to the surface via the logging cable. The signal received at the surface is generally adjusted in amplitude to restore the reference pulses to a predetermined constant amplitude in an automatic gain control circuit to thereby compensate the signal for amplitude variations due to temperature changes, etc. The reference pulses are thereafter removed from the signal and the remaining signal is evaluated as to pulse amplitude and rate to provide the hydrocarbon information.

Naturally occurring gamma ray detectors are also well known and such systems generally include a logging tool adapted for movement through the well bore and containing a scintillation detector responsive to the gamma radiation naturally emitted by the formation. This desired information is generally contained in the pulse rate of the pulse signal from the scintillation detector.

Both of the above detectors are extremely useful and it is desired to achieve both the hydrocarbon data and the natural gamma ray data in a single pass through the well bore to thereby achieve a significant savings in both time and effort. In addition, the obtaining of both naturally occurring gamma ray information and the hydrocarbon information simultaneously eliminates any errors in the correlation as a function of depth of the two logs when separately run.

The mutual interference of the two signals when sent uphole over the same logging cable has in the past proscribed the simultaneous gamma ray and hydrocarbon logging of a well bore and it is accordingly an object of the present invention to obviate the deficiencies of known prior art systems and to provide a novel logging tool and method for the simultaneous detection of hydrocarbons and naturally occurring gamma rays within a well bore.

Another object of the present invention is to provide two scintillation detector well logging tool and method in which the output signals therefrom are transmitted to the surface over a single cable with a minimum of interference.

A further object of the present invention is to provide a novel method and well logging system for hydrocarbons and naturally occurring gamma rays in which the number of components and circuit complexity are minimized over that required for a single function logging tool.

These and many other objects and advantages of the present invention will be readily apparent to one skilled in the art to which the invention pertains from the claims and from the following detailed description when read in conjunction with the appended drawings.

THE DRAWINGS

THE DETAILED DESCRIPTION

Figure 1:
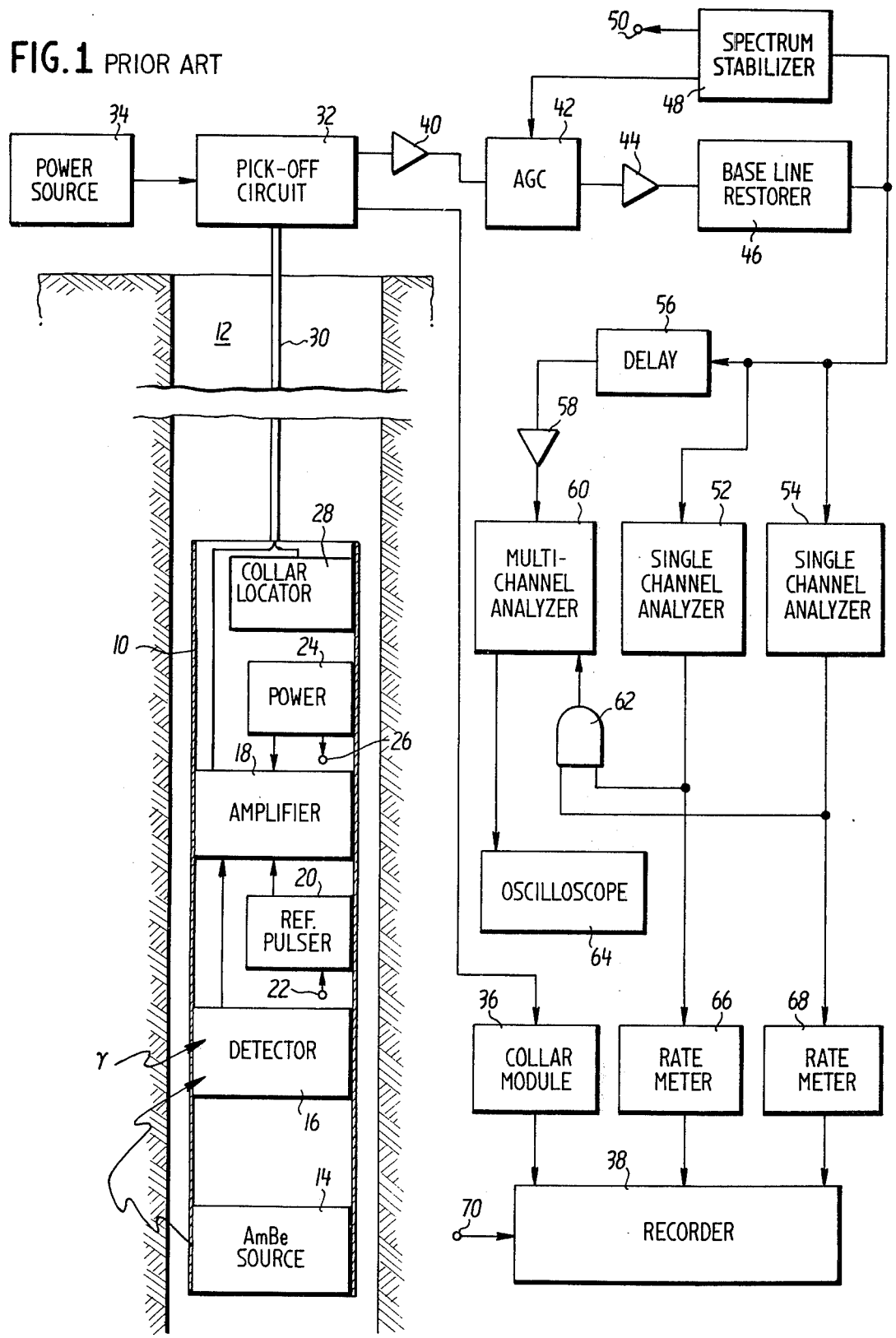
FIG. 1 is a functional block diagram of a prior art hydrocarbon detecting well logging system with the addition of certain terminals to which the additional equipment of the present invention may be connected.

With reference now to FIG. 1, a well logging tool 10 is illustrated in a well bore 12. The tool 10 contains at the lower end thereof a suitable conventional source 14 of radioactive material such as americium beryllium. A suitable conventional detector 16 such as a scintillating sodium iodide crystal and photomultiplier is disposed in the well tool 10 adjacent the source 14. The output signal from the detector 16 is applied to a suitable conventional amplifier 18 to which is also applied the output signal from a reference pulser 20. The reference pulser 20 is provided with an input terminal 22 to which is attached the additional equipment hereinafter described in connection with FIG. 2. The detector amplifier and reference pulser may be housed in a vacuum flask for temperature stability although the flask has been omitted from the drawings in the interest of clarity.

Figure 2:
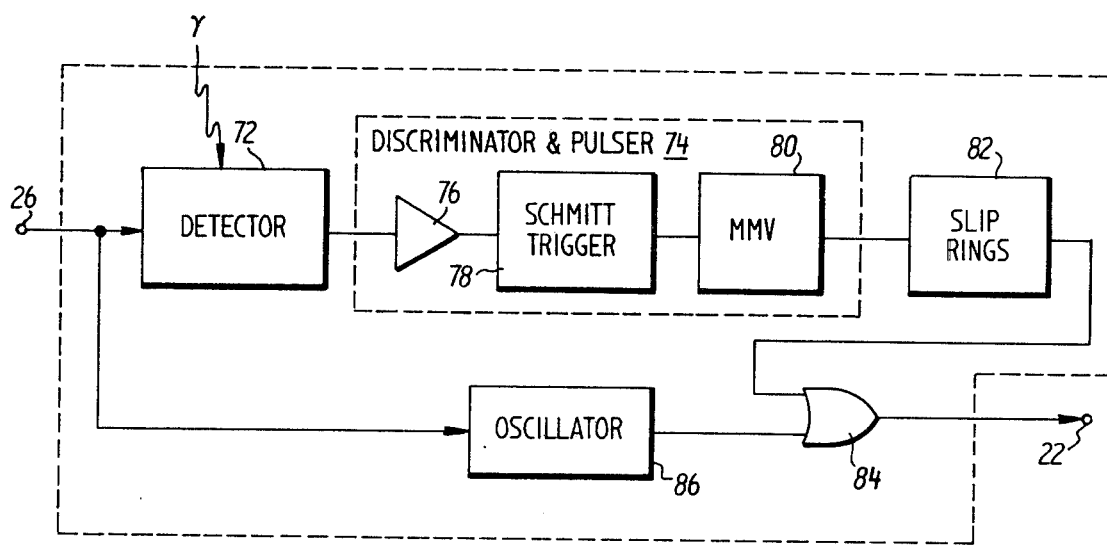
FIG. 2 is a functional block diagram of the additional apparatus needed in the well logging tool of FIG. 1 for the conversion thereof to the dual logging tool of the present invention; and, FIG. 3 is a functional block diagram of the additional apparatus needed at the surface of the system illustrated in FIG. 1 for the conversion thereof to the dual logging system of the present invention.

The amplifier 18 receives power from a conventional source 24 which is provided with an output terminal 26 for connection to the downhole additional apparatus of the present invention described infra in connection with FIG. 2.

The amplifier 18 and the collar locator 28 provide output signals which are fed to the logging cable 30 by which the tool 10 is suspended from the surface. At the surface, the logging cable 30 is electrically connected to a suitable conventional pick-off circuit 32 powered by a suitable conventional source 34. The cable may be coaxial cable in which the outer conductive sheath and an intermediate insulated conductor are utilized for the transmission of power and the collar signal and in which the intermediate and inner insulated conductors are utilized for the transmission of the pulse signal.

With continued reference to FIG. 1, the collar locator output signal from the pick-off circuit 32 may be applied to a suitable conventional collar module 36 which provides an output signal to a recorder such as the illustrated strip chart recorder 38 as an indicia of depth.

The pick-off circuit 32 also provides an output signal which is applied through a suitable conventional differentiating amplifier 40, automatic gain control circuit 42 and amplifier 44 to a suitable conventional base line restorer circuit 46. The output signal from the base line restorer 46 may be applied through a spectrum stabilizer 48 to the automatic gain control circuit 42 to adjust the gain of the automatic gain control circuit 42 in a manner well known in the art. The spectrum stabilizer 48 may also be provided with an output terminal 50 to which the additional surface equipment of the present invention may be connected as hereinafter described in connection with FIG. 3.

The base line restorer 46 output signal is also applied to a pair of single channel analyzers 52 and 54 and through a conventional delay circuit 56 and amplifier 58 to a multichannel analyzer 60. The output signal from single channel analyzer 52 or 54 may be applied through a gate 62 to multichannel analyzer 60 and the output signal from the multichannel analyzer 60 applied to a suitable conventional oscilloscope 64 such as the Tektronix Type RM 504.

The output signals from the single channel analyzers 52 and 54 may also be applied responsively to a pair of conventional rate meters 66 and 68 and the output signals from the rate meters 66 and 68 applied to the strip chart recorder 38. The recorder 38 may additionally be provided with an input signal by way of an input terminal 70 for recording of the signal provided by the additional surface circuitry of the present invention as described infra in connection with FIG. 3.

In operation, the tool 10 is lowered within the well bore 12 and radiation from the source 14 radiated into the formation. The reflected and back-scattered radiation from the formation together with naturally occurring gamma rays are detected by the scintillating crystal to provide light pulses which are in turn converted to electrical energy by the photomultiplier tube of the detector 16. Conventionally, the threshold levels of the single channel analyzers 52 and 54 are adjusted in an effort to eliminate the naturally occurring gamma rays so that the output signals are indicative of hydrocarbons in the formation.

The output signal from the detector is amplified in the amplifier 18 and passed to the surface through logging cable 30. Additionally, the reference pulser 20, which may include a constant frequency oscillator omitted in the drawings in the interest of clarity, provides a series of constant amplitude output pulses to the amplifier 18 for transmission through the logging cable 30 to the surface. The signals transmitted to the surface are thus conventionally a casing collar depth signal and two intermixed pulse signals in which the signal from the reference pulser provides a reference and in which the amplitude and rate of the pulses from the detector reflect the hydrocarbon content of the formation under investigation.

With continued reference to FIG. 1, the intermixed series of pulses from the well tool 10 are sensed at the surface by the pick-off circuit 32 which may receive both high and low voltage power from the single source shown in the drawings in the interest of clarity. The collar locator signal may be applied directly to the collar module 36 for recording on the strip chart recorder 38 in a conventional manner as a depth indication.

The intermixed pulse output signal from the pick-off circuit 32 may be differentiated in the amplifier 40 and applied through the automatic gain control circuit 42 and amplifier 44 to the base line restorer 46 to maintain the proper base line level. The output signal from the base line restorer is applied to the spectrum stabilizer 48 which discriminates to respond only to the reference pulses. The amplitude of these reference pulses is evaluated with respect to the original amplitude thereof and an appropriate adjustment made in the control signal applied to the automatic gain control circuit 42.

The base line restorer output signal may then be applied in a conventional manner to the single and multichannel analyzers 52, 54 and 60 in a conventional manner for display on the strip chart recorder 38 and oscilloscope 64.

Systems of the type illustrated in FIG. 1 hereof are described in pending application Ser. No. 181,910 "Pulsed Neutron Logging System with Gain Compensation" (D No. 72,490), filed Sept. 20, 1971, and the pending applications referenced therein, and application Ser. No. 192,883 "Well Logging System and Method Using an Armored Coaxial Cable and Compensation Circuit" (D No. 71,406-CI), filed Oct. 27, 1971, and application Ser. No. 82,028 filed Oct. 19, 1970, by Hans J. Paap and Robert W. Pitts referenced therein. Said applications are all assigned to Texaco, Inc., and the disclosure thereof is hereby incorporated herein by reference.

With reference now to FIG. 2 where the subsurface additional apparatus of the present invention is illustrated, the power supply 24 of FIG. 1 may be utilized to supply operating power to the circuit by way of an input terminal 26. An additional conventional gamma ray detector 72 such as that earlier described in connection with FIG. 1 may be positioned to receive naturally occurring gamma rays from the formation. The detector 72 may be physically shielded from the radiation which results from bombardment of the formation by the source 14 so that the detector 72 is responsive only to the naturally occurring gamma radiation.

The output signal from the detector 72 may be applied to a discriminator and pulser circuit 74 which may include an amplifier 76, a Schmitt trigger circuit 78 and a monostable or one-shot multivibrator 80 connected in series. The true output terminal of the monostable multivibrator 80 may supply the output signal of the discriminator and pulser circuit 74 and this signal may be applied through conventional slip rings 82 to one input terminal of a two input terminal OR gate 84. The output terminal of the OR gate 84 may be connected to the input terminal 22 of the reference pulser 20 of FIG. 1 and the other input terminal of the OR gate 84 may be connected to receive the output signal from an oscillator 86 utilized in lieu of the oscillator (not shown) in the reference pulser 20 of FIG. 1.

In operation, the circuit of FIG. 1 as modified to include the circuit of FIG. 2 performs as earlier described to provide to the cable 30 a first series of pulses related in amplitude to the radiation sensed by the detector 16. Naturally occurring gamma radiation is, however, additionally detected by the detector 72 of FIG. 2 and pulses related in pulse repetition rate thereto are applied through the OR gate 84 to the input terminal 22 of the reference pulser 20. Additional pulses are supplied through the OR gate 84 to the input terminal 22 of the reference pulser 20 from the oscillator 86 at a predetermined constant frequency.

The frequency of the reference pulses supplied through the amplifier 18 and collar locator 28 to the cable 30 are thus a function of the output frequency of the oscillator 86 and the naturally occurring gamma radiation rather than the sole function of the oscillator within the reference pulser 20 of the prior art system. With the frequency of the output signal from the oscillator 86 set at about 100 Hz, the reference pulses will be provided at a repetition rate of from about 120 to about 350 pulses per second. The frequency of the output signal from the oscillator 86 is desirably selected to ensure at least a minimum acceptable number of constant amplitude reference pulses for the automatic gain control compensation function earlier described. This frequency is, because of the reasonable expectation of the number of additional pulses resulting from the detection of naturally occurring gamma rays from the formation, significantly reduced from the frequency of the oscillator conventionally utilized with the reference pulser 20 of the prior art system. In this manner the reference pulses provide not only the amplitude compensation information but also the additional information regarding the occurrence of natural gamma radiation in the formation.

Figure 3:
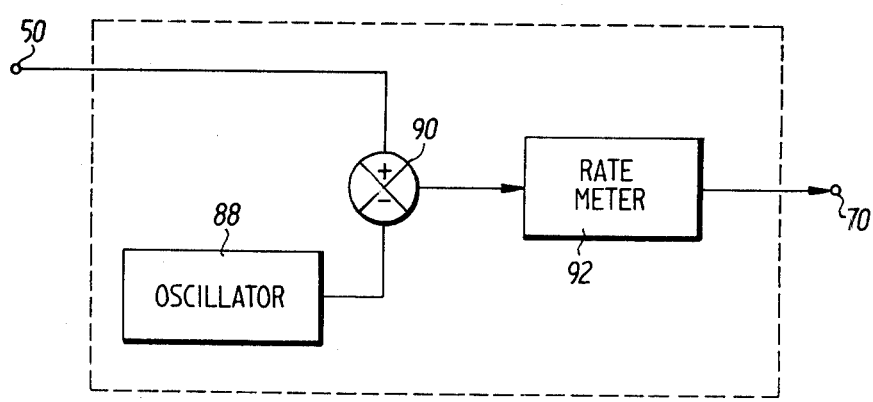

With reference to FIG. 3 where the additional surface circuitry of the present invention is illustrated, the output terminal 50 of the spectrum stabilizer 48 of FIG. 1 may be directly connected to the positive input terminal of a suitable conventional algebraic summing or subtractor circuit to which a suitable conventional oscillator may be connected by way of the negative input terminal thereof. The output signal from the subtractor circuit 90 may be applied through a suitable conventional rate meter 92 to the input terminal 70 of the recorder 38.

In operation, the spectrum stabilizer 48 of FIG. 1 functions as earlier described to separate the constant amplitude reference pulses from the series of pulses representative of hydrocarbon content in the formation. The reference pulses are generally quite a bit larger in amplitude than the hydrocarbon responsive pulses and this discrimination may easily be accomplished on the basis of amplitude.

The reference pulses applied to the input terminal 50 of the circuit of FIG. 3 are reduced in number by the subtractor by the pulses occurring in the output signal from the oscillator 88. The frequency of the output signal from the oscillator 88 is desirably selected to be identical to that of the frequency of the output signal from the oscillator 86 of the circuit of FIG. 2 to thereby remove the effects of oscillator 86 on the number of reference pulses. Since the number of reference pulses was a function of the frequency of the output signal from the oscillator 86 and the occurrence of natural gamma rays from the formation, oscillator 86 provides an offset which makes the frequency of the output signal from the subtractor 90 of FIG. 3 a sole function of the naturally occurring gamma radiation. This natural gamma radiation representative signal may be applied through the rate meter for recording on the recorder 38 of FIG. 1 in depth correlation with the hydrocarbon data as earlier described.

ADVANTAGES AND SCOPE OF THE INVENTION

It will be apparent from the foregoing detailed description that the present invention effects the conversion of a single function logging tool to a dual function logging tool with a minimum of components and extremely simple circuitry. This conversion is accomplished by making the rate of amplitude reference pulses which are necessary for the operation of the single function tool a function of the second type of information. To ensure the operation of the single function tool in the absence of the second function, a minimum acceptable number of amplitude reference pulses are provided for subsequent removal by means of a simple offset circuit. Interference between the two sources of information may thus be minimized.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for simultaneously logging two well bore parameters comprising:
    a logging tool adapted to traverse a well bore;
    a first parameter detector carried by said tool for providing a first data signal in the form of variable amplitude, variable frequency pulses;
    an oscillator carried by said tool for providing a series of constant amplitude reference pulses;
    a second parameter detector carried by said tool for providing a second data signal in the form of variable frequency pulses equal in amplitude to said reference pulses;
    cable means for transmitting said first and second data signals and said reference pulses to the surface as a combined signal;
    means at the surface for modifying the amplitude of said combined signal responsively to the amplitude of said reference pulses and said second data signal;
    means at the surface for separating said first data signal from said combined signal on the basis of amplitude;
    means at the surface for recording said first data signal; and,
    means at the surface for recording the number of pulses in said second data signal.

2. The system of claim 1 wherein said means for recording the number of pulses in said second data signal includes:
    means for providing an offset signal related in frequency to the frequency of said reference pulses; and,
    means for algebraically combining said offset signal with said second data signal and said reference pulses.

3. In a data transmission system wherein amplitude variable data pulses and predetermined amplitude reference pulses are transmitted over a common transmission link, the method of transmitting additional data over the same transmission link without interference comprising the steps of:
    a. providing a minimum acceptable number of constant frequency pulses;
    b. providing a series of pulses related in number to the additional data to be transmitted;
    c. providing constant amplitude pulses related in number to the sum of the constant frequency pulses and the additional data related pulses;
    d. transmitting over the transmission link both the amplitude variable data pulses and the constant amplitude reference pulses;
    e. separating the transmitted reference pulses from the transmitted amplitude variable data pulses; and, f. subtracting from the separated reference pulses a number of pulses related to the constant frequency pulses to thereby provide a series of pulses related in number to the additional data.

4. A method of transmitting two data signals over a common line comprising the steps of:
   a. providing a first data signal in the form of variable amplitude pulses;
   b. providing a second data signal in the form of variable frequency pulses;
   c. providing a constant amplitude reference signal having a frequency related to the sum of a predetermined constant frequency and the second data signal;
   d. transmitting the reference signal and the first data signal over a common line;
   e. separating the transmitted first data signal pulses from the transmitted reference pulses;
   f. modifying the amplitude of the first data signal as a function of the amplitude of the transmitted reference pulses to thereby provide a first data output signal; and,
   g. reducing the number of transmitted reference pulses by a number related to the predetermined constant frequency to thereby provide a second data output signal.

* * * * *